Vol# UNITED STATES PATENT OFFICE.

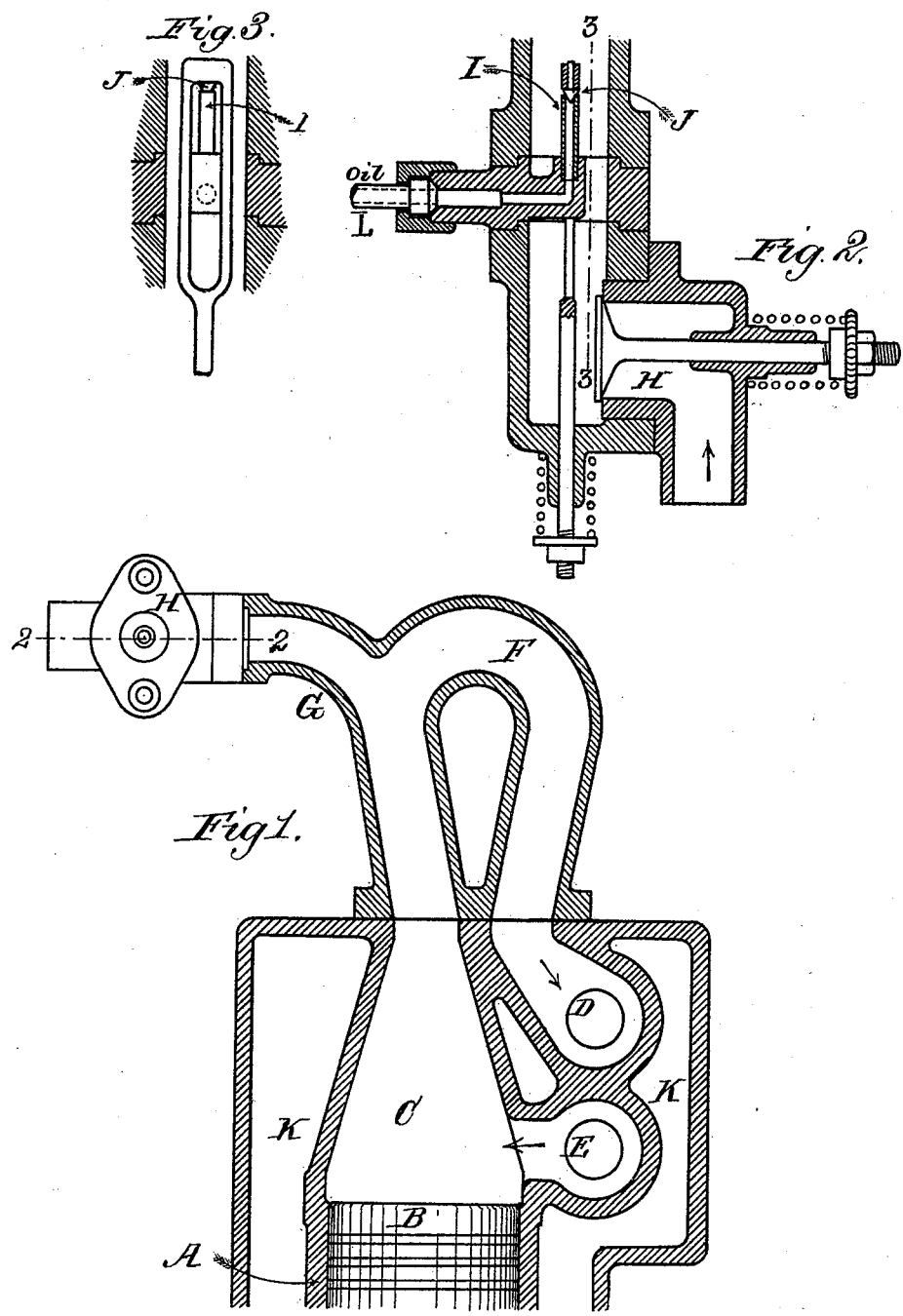

JOHN FIELDING, OF UPTON ST. LEONARDS, ENGLAND.

INTERNAL-COMBUSTION MOTOR.

SPECIFICATION forming part of Letters Patent No. 615,978, dated December 13, 1898.

Application filed December 20, 1897. Serial No. 662,625. (No model.)

*To all whom it may concern:*

Be it known that I, JOHN FIELDING, a citizen of England, residing at Upton St. Leonards, in the county of Gloucester, England, have invented a new and useful Improvement in Internal-Combustion Motors, of which the following is a specification.

My invention relates to an improved arrangement of the ignition-tube for gas and oil motor engines which is sufficiently heated internally by the combustion of the charge to enable the heating-lamp to be dispensed with. The advantages of automatic ignition without the use of a lamp are of such importance that engines so fitted are generally preferred on account of their simplicity, even though, as is well known, some sacrifice of efficiency is involved. This loss of efficiency is due to the employment of a hot combustion-chamber of relatively large capacity, holding, in fact, the great part of the explosive charge. The successful working of such engines depends upon the fact that this combustion-chamber presents a large surface to be heated by the explosion and upon the fact that it is connected to the water-jacketed cylinder only by a small neck, so as to minimize the conduction of heat from the chamber to the cylinder. In consequence of the large area of heated surface preignition of the charge tends to take place, especially under heavy loads, so much so that anything like accurate firing of the charge at about the dead-point is practically impossible. Another disadvantage arising from the large area of the heating-surface is that each incoming fresh charge is dilated to such an extent by the heat taken up before compression begins that the volume of fresh air drawn in is much smaller than would be the case if the combustion-chamber were cooled, and consequently a larger cylinder is required for a given power. Furthermore, the heat radiated from this large hot chamber is highly inconvenient when an engine is working in a confined space. The preliminary heating of the large combustion-chamber also necessitates the use of a very powerful heating-lamp, with a proportionately large consumption of oil or gas. The great heat of such a lamp or flame also is most inconvenient in confined spaces. In order to overcome these defects, I employ an igniting apparatus of such capacity that only a relatively small proportion of the charge is compressed into it, and the consequent reduction in the area of the surface to be heated makes it necessary that some other provision be made for imparting the required heat besides that produced by the effect of the internal combustion, which alone would be insufficient, and I therefore arrange the ignition-tube so that it acts as a channel or passage connecting the combustion-chamber with the exhaust-valve chamber, both of which are water-jacketed. The area of cross-section of the igniting-tube must therefore be such as to allow sufficiently free escape of the exhaust-gases. The passage through the tube of the whole of the escaping highly-heated products of combustion contributes largely to the necessary heating effect, notwithstanding the smallness of the surface and the fact that the ends of the tube are connected by apertures of the full area with the water-jacketed parts of the cylinder.

The ignition-tube may be made and arranged in any convenient manner; but I find it most convenient to make it in the form of a horseshoe bend, which permits of free expansion of the tube when heated and offers little resistance to the flow of the escaping gases.

It will be clear from the foregoing that my object is to make my improved igniting-tube as small and to maintain its temperature as high as possible, so as to secure approximately the results which are obtained by the use of ordinary externally-heated small ignition-tubes. The horseshoe shape of the igniting-tube is advantageous, since it presents a large surface in a substantial and strong form with a single-faced joint at the cylinder, as will be seen. The tube may be surrounded by a suitable casing containing the heating-lamp, or the arch formed by the horseshoe bend may be used so as to act as a flue or chimney for the heating-lamp, thus dispensing with a separate inclosing chamber.

In an oil-engine my improved igniting-tube may be utilized for vaporizing the charge or a separate vaporizer may be employed in any suitable known manner.

When used as a vaporizer, I fit the igniting-tube with a branch pipe, through which the oil mixed with air is drawn, the said air being, if desired, previously heated by radiation from the igniting-tube. The main body of air is, however, drawn into the water-jacketed combustion-chamber through an air-inlet valve of the usual construction. The oil-vapor and air entering the combustion-chamber from the vaporizer are there mixed thoroughly with the main air charge during the drawing-in stroke of the piston. The mixed charge is compressed by the following stroke and a small portion of it is forced into the igniting-tube, which fires the charge at about the point of maximum compression.

In the accompanying drawings, Figures 1, 2, and 3, the invention is shown as applied to an oil-motor. Fig. 1 is a sectional plan showing the rear end of the cylinder. Fig. 2 is a vertical section on the line 2 2 of Fig. 1. Fig. 3 is a plan on the line 3 3 of Fig. 2.

A is the cylinder; B, the piston; C, the combustion-chamber; D, the exhaust-valve; E, the main air-inlet valve; F, the horseshoe bend, which at starting is heated by a lamp; G, the branch pipe; H, the air-inlet valve on same; I, the oil-supply jet, supplied by the pipe L from a suitable pump and fitted with non-return valve J.

K is a water-jacket which surrounds the cylinder, combustion-space, and main air-inlet and exhaust-valve chambers.

Having thus described the nature of this invention and the best means I know for carrying the same into practical effect, I claim—

In an internal-combustion motor, the combination with the explosive-cylinder having a combustion-chamber and exhaust-valve chamber, of an external igniting-tube of horseshoe shape having its opposite ends connected with one end of the explosive-cylinder by a single-faced joint and forming a passage leading into the said combustion-chamber and exhaust-valve chamber respectively, a branch pipe communicating with said igniting-tube on that side adjacent to the combustion-chamber, and an air and oil supply for said branch pipe, substantially as described.

In testimony whereof I have signed my name to this specification, in the presence of two subscribing witnesses, this 10th day of December, A. D. 1897.

JOHN FIELDING.

Witnesses:
H. J. E. ASTMAN,
W. J. H. PALIN.